United States Patent
Park (10) Patent No.: US 7,702,321 B2
(45) Date of Patent: Apr. 20, 2010

(54) APPARATUS FOR MAPPING ABBREVIATED NUMBERS IN MOBILE COMMUNICATION TERMINAL AND METHOD THEREOF

(75) Inventor: Jung-Hoon Park, Suwon-si (KR)

(73) Assignee: Samsung Electronics Co., Ltd., Suwoon-si (KR)

(*) Notice: Subject to any disclaimer, the term of this patent is extended or adjusted under 35 U.S.C. 154(b) by 1377 days.

(21) Appl. No.: 11/128,434

(22) Filed: May 13, 2005

(65) Prior Publication Data

US 2005/0260977 A1 Nov. 24, 2005

(30) Foreign Application Priority Data

May 13, 2004 (KR) .................. 10-2004-0033708

(51) Int. Cl.
*H04M 3/00* (2006.01)
*H04M 1/00* (2006.01)

(52) U.S. Cl. .................. 455/418; 455/564; 455/566

(58) Field of Classification Search .............. 455/412, 455/418, 564, 415, 566; 379/357.04, 433.07, 379/368

See application file for complete search history.

(56) References Cited

U.S. PATENT DOCUMENTS

| 4,475,013 A * | 10/1984 | Lee et al. .............. 379/357.04 |
| 2001/0053690 A1 * | 12/2001 | Inoue .......................... 455/415 |
| 2003/0048897 A1 * | 3/2003 | Luo ...................... 379/433.07 |

* cited by examiner

*Primary Examiner*—Melur Ramakrishnaiah
(74) *Attorney, Agent, or Firm*—Roylance, Abrams, Berdo & Goodman, L.L.P.

(57) ABSTRACT

Disclosed are an apparatus for mapping abbreviated numbers in a mobile communication terminal and a method thereof which can map abbreviated numbers so that the abbreviated numbers correspond to the initial characters of preset units that constitute the names of opposite parties. In the mobile communication terminal, if information of an opposite party is input, initial characters are extracted from preset units that constitute a name of the opposite party in the input information of the opposite party, and numerals pre-mapped on the respective extracted characters are detected. The detected numerals are mapped on an abbreviated number of the information of the opposite party, and then the information of the opposite party and the abbreviated number mapped on the information of the opposite party are stored.

14 Claims, 6 Drawing Sheets

APPARATUS FOR MAPPING ABBREVIATED NUMBERS IN MOBILE COMMUNICATION TERMINAL AND METHOD THEREOF

PRIORITY

This application claims the benefit under 35 U.S.C. §119(a) of an application entitled "Apparatus for Mapping Abbreviated Numbers in Mobile Communication Terminal and Method Thereof" filed in the Korean Intellectual Property Office on May 13, 2004 and assigned Serial No. 2004-33708, the entire contents of which are hereby incorporated by reference.

BACKGROUND OF THE INVENTION

1. Field of the Invention

The present invention relates to an apparatus for mapping abbreviated numbers in a mobile communication terminal and a method thereof. More particularly, the present invention relates to an apparatus for mapping abbreviated numbers in a mobile communication terminal and a method thereof which can map abbreviated numbers so that the abbreviated numbers correspond to the initial characters of preset units that constitute the names of opposite parties, that is, parties to be called.

2. Description of the Related Art

Generally, when a user intends to make a phone call using a mobile communication terminal, he/she directly inputs a phone number through a keypad, or performs a dialing operation by searching and inputting pre-stored information about the name and phone number of the opposite party that the user desires to call on the phone.

Figure 1:
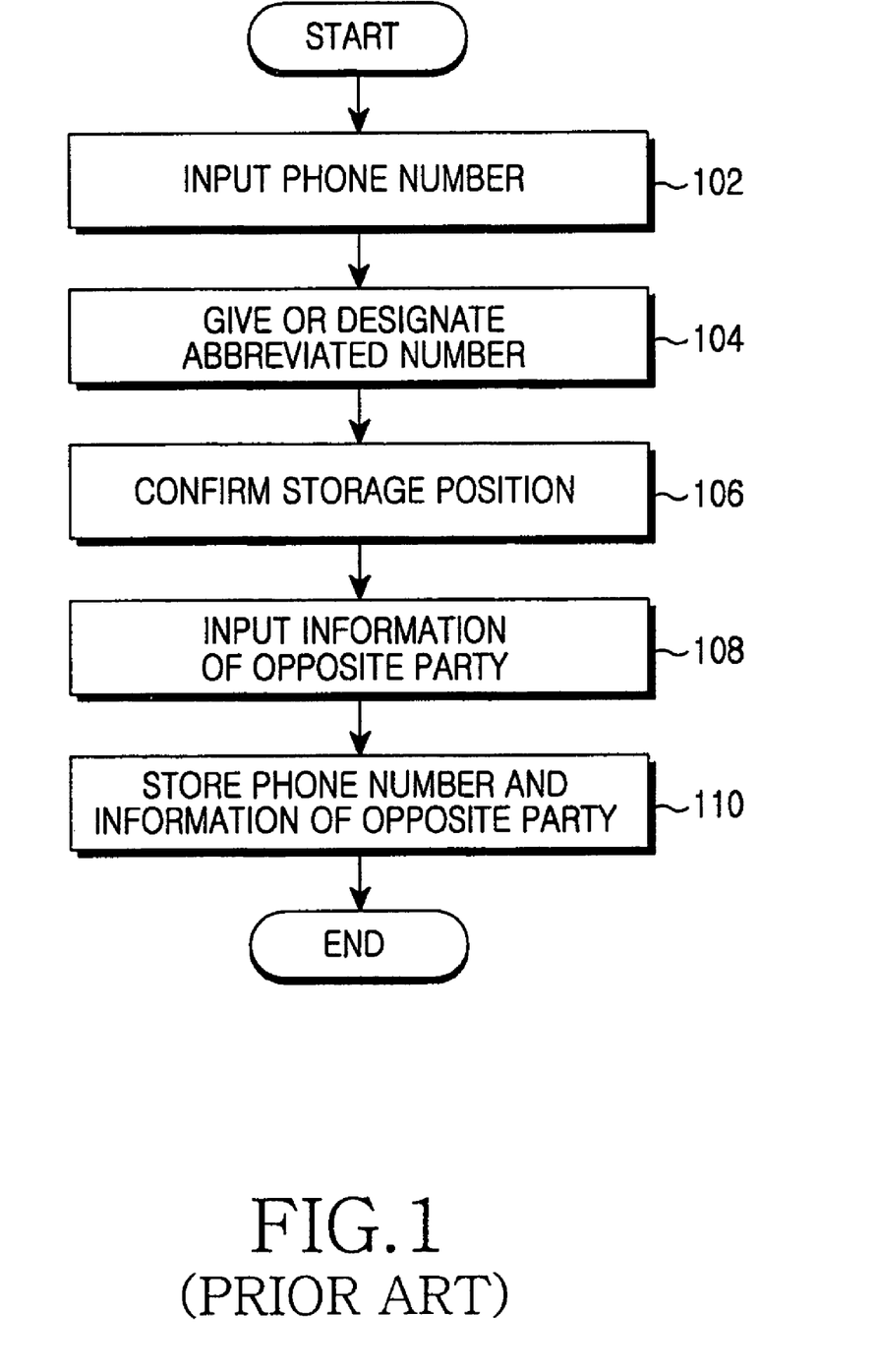
FIG. 1 is a view illustrating a process of storing a phone number and opposite party's information in a conventional mobile communication terminal.

FIG. 1 is a view illustrating a process of storing a phone number and the opposite party's information in a conventional mobile communication terminal.

Referring to FIG. 1, the conventional mobile communication terminal receives an input of an opposite party's phone number that the user intends to store (step 102). Here, the mobile communication terminal that has received an input of the opposite party's phone number gives an abbreviated number that has not yet been used in the terminal to the phone number to be stored, or allocates the abbreviation number to the phone number through the designation of the abbreviation number input by the user (step 104). After the allocation of the abbreviation number to the phone number, the mobile communication terminal receives a user's confirmation of a position at which the phone number is to be stored (step 106). After the confirmation of the storage position, the mobile communication terminal receives an input of the abbreviation number and the opposite party's information such as the name of the opposite party (e.g., name, nickname, firm name, name of a public institution, and the like), opposite party's phone number (such as mobile phone number, home phone number, office phone number, and the like), message, and similar information (step 108). Through the above-described input process, the mobile communication terminal stores the phone number, abbreviation number and opposite party's information (step 110). Accordingly, the terminal inputs and stores the opposite party's information in advance, and then if the user intends to make a call to the opposite party, he/she performs the dialing through a search for the stored information.

Figure 2:
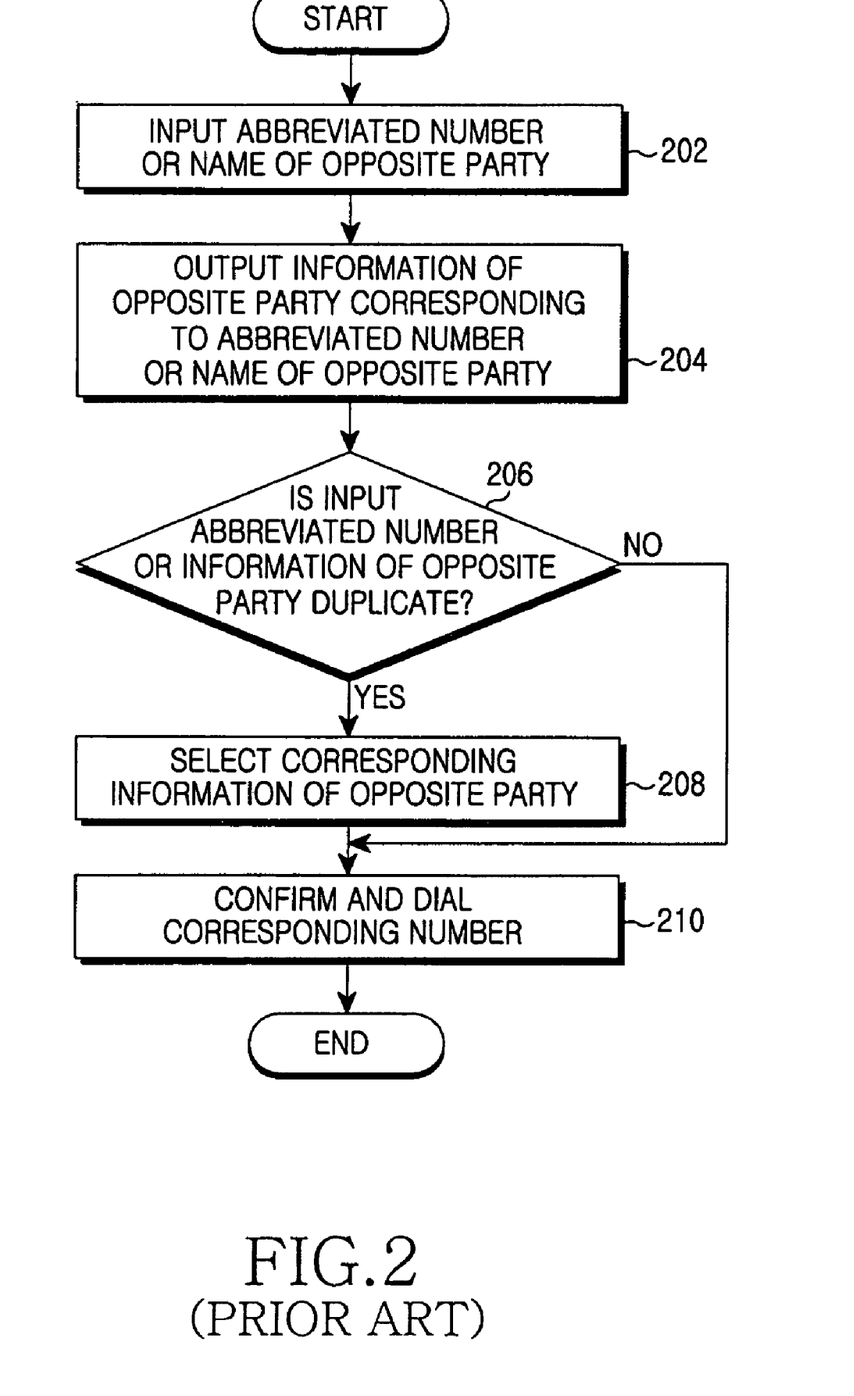
FIG. 2 is a view illustrating a dialing process using the opposite party's name and the corresponding abbreviated number in a conventional mobile communication terminal.

FIG. 2 is a view illustrating a dialing process using the opposite party's name and the corresponding abbreviated number in a conventional mobile communication terminal.

Referring to FIG. 2, when the user performs a dialing operation to make a phone call to another person, the mobile communication terminal receives an input of the abbreviated number or name of the opposite party from the user (step 202). The mobile communication terminal searches for and outputs the searched opposite party's information that corresponds to the abbreviated number or the name of the opposite party input by the user (step 204). In this case, the searched opposite party's information may be one or two or more duplicate sets of information. The mobile communication terminal confirms the opposite party's information with respect to the user's input through the result of the search, and then determines whether the abbreviated number or the name of the opposite party stored in the mobile communication terminal is a duplicate through the user's input (step 206) (e.g., multiple telephone numbers such as a work or mobile number are stored for the same abbreviated number or name). At this time, if the opposite party's information is a duplicate, the mobile communication terminal receives the user's selection of the corresponding opposite party's information from among the searched duplicate opposite party's information, and then selects the corresponding opposite party's information accordingly (step 208). At this time, the mobile communication terminal confirms the corresponding number stored in the mobile communication terminal and performs the dialing (step 210).

While the user uses the mobile communication terminal, the following problems can occur. In the case of performing the dialing operation using the abbreviated number as described above, it is difficult in practice that the user remembers a large number of phone numbers stored in order to use the abbreviated numbers. Accordingly, this results in that the user of the mobile communication terminal does not use the many of the abbreviated numbers except for those abbreviated numbers that the user can remember. For example, the several abbreviated numbers that the user can remember may be '1' corresponding to his/her home phone number, '2' corresponding to his/her office phone number, '3' corresponding to his/her intimate friend and so on.

Additionally, instead of using the abbreviated number, the user directly inputs the name of the opposite party stored in the mobile communication terminal, or selects and performs a dialing operation of the opposite party's phone number to which the user desires to make a phone call using a phone book stored in the mobile communication terminal. It typically takes up to tens of seconds for the user to select the opposite party's phone number to which the user desires to make a phone call.

SUMMARY OF THE INVENTION

Accordingly, the present invention has been designed to solve the above and other problems occurring in the prior art, and an object of the present invention is to provide an apparatus for mapping abbreviated numbers in a mobile communication terminal and a method thereof.

Another object of the present invention is to provide an apparatus for mapping abbreviated numbers in a mobile communication terminal and a method thereof which can map abbreviated numbers so that the abbreviated numbers correspond to the initial characters of preset units that constitute the names of opposite parties.

In order to accomplish the above and other objects, there is provided an apparatus for mapping abbreviated numbers in a mobile communication terminal, according to an embodiment of the present invention, which comprises a memory for storing a mapping table in which numerals are mapped on respective characters, information of opposite parties, and abbreviated numbers generated and mapped on the information of the opposite parties by extracting the numerals from the mapping table in correspondence to initial characters of respective preset units that constitute names of the opposite parties in the information of the opposite parties, and a control unit for operating to extract the initial characters from the respective preset units that constitute the name of the opposite party, and mapping the abbreviated number on the information of the opposite party by mapping the extracted characters on the numerals in the mapping table if the information of the opposite party is input.

In another aspect of the present invention, there is provided a method of mapping abbreviated numbers in a mobile communication terminal, which comprises the steps of, if information of an opposite party is input, extracting initial characters from preset units that constitute a name of the opposite party in the input information of the opposite party, detecting numerals pre-mapped on the respective extracted characters and mapping the detected numerals on an abbreviated number of the information of the opposite party, and mapping and storing the information of the opposite party and the abbreviated number mapped on the information of the opposite party.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF EXEMPLARY EMBODIMENTS

Exemplary embodiments of the present invention will be described in detail hereinafter with reference to the accompanying drawings. In the following description of embodiments of the present invention, only features and structures necessary for understanding the operation of the present invention will be explained, and a detailed description of well known functions and configurations incorporated herein will be omitted for the sake of clarity and conciseness.

Figure 3:
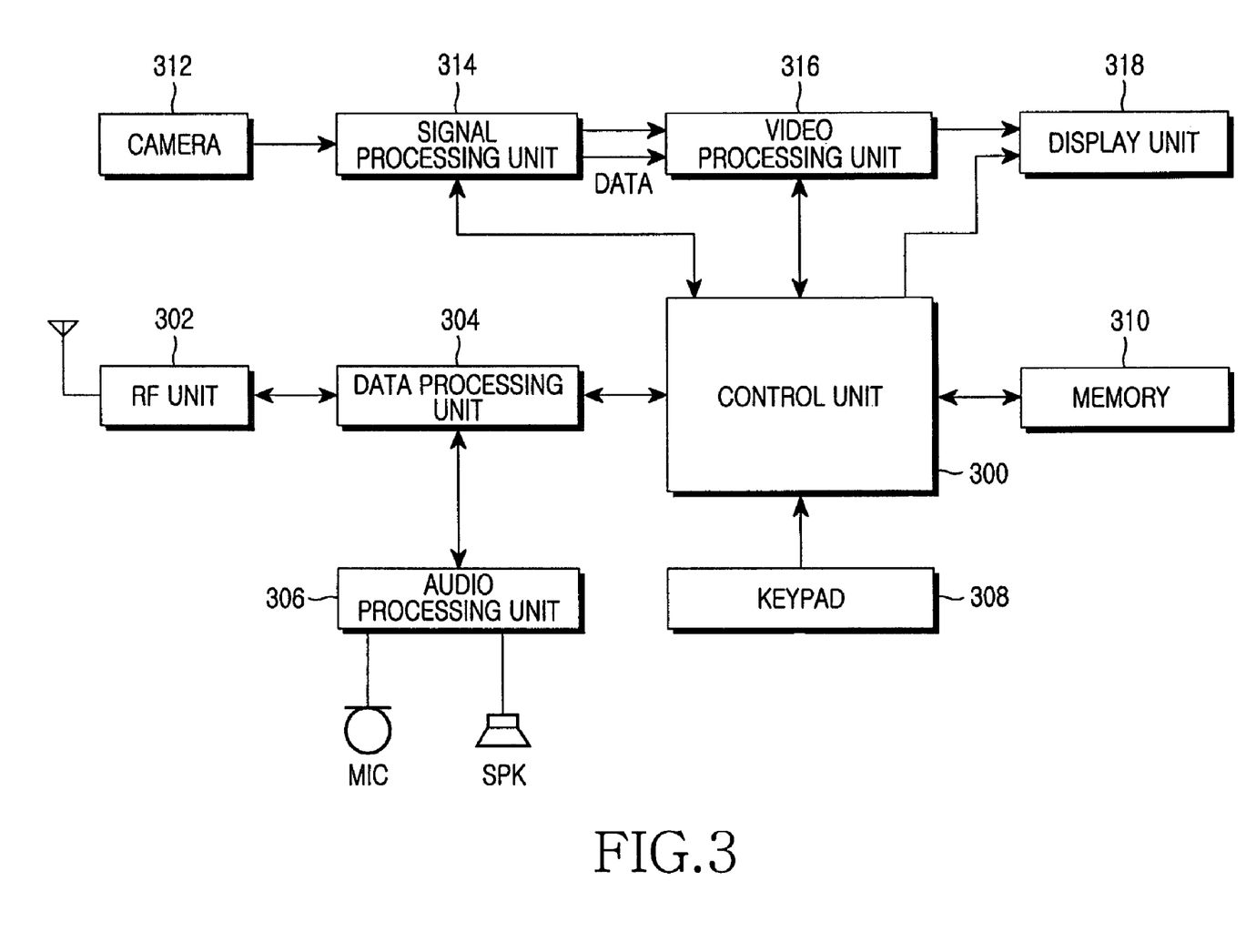
FIG. 3 is a view illustrating the construction of a mobile communication terminal adapted to set abbreviated numbers according to an embodiment of the present invention.

FIG. 3 is a view illustrating the construction of a mobile communication terminal adapted to set abbreviated numbers according to an embodiment of the present invention.

Referring to FIG. 3, an RF unit 302 processes data that is transmitted and received in a radio frequency band. The RF unit comprises an RF transmitter for up-converting and amplifying the frequency of a transmitted signal, and an RF receiver for low-noise-amplifying and down-converting the frequency of the received signal.

A data processing unit 304 is provided with a transmitter for encoding and modulating the transmitted signal, and a receiver for decoding and demodulating the received signal. That is, the data processing unit 304 may be provided with a modem and a codec.

An audio processing unit 306 serves to reproduce a received audio signal output from the data processing unit 304 by speaker SPK, or transmit a transmitted audio signal generated from a microphone MIC to the data processing unit 304.

A keypad 308 is provided with keys for inputting numerals and characters and function keys for setting various kinds of functions. In a currently used mobile communication terminal, numeral keys of '0' to '9' and basic character keys for a language construction are preferably used. In an embodiment of the present invention, 'characters' mean basic characters for the language construction, for example, alphabets in English, characters such as vowels and consonants in Hangul, and the like. When the user stores a phone number using the keypad composed of the numeral and character keys, the mobile communication terminal sets and stores an abbreviated number in correspondence to initial characters of respective preset units that constitute the name of an opposite party. The method of setting the abbreviated number according to the number of the opposite party will be explained later in more detail.

A memory 310 may be composed of a program memory and a data memory. In the program memory, programs for controlling the general operations of the mobile terminal. In the data memory, data generated while the terminal operates is temporarily stored. Additionally, in the memory 310, a mapping table in which numerals and characters are mapped on each other according to the embodiment of the present invention is stored. Also, the abbreviated numbers which are mapped on the respective initial characters of the units preset in the mobile communication terminal such as syllables or space units of the opposite parties are stored.

A control unit 300 controls the overall operation of the mobile terminal. Also, the control unit 300 may include the data processing unit 304. In an embodiment of the present invention, if the name of the opposite party, the phone number and other information of the opposite party are input, the control unit 300 extracts the respective initial characters of the respective syllables or space units of the input name, and maps the name of the opposite party on the corresponding numerals with reference to the mapping table. The mapping process and the mapping table will be explained later in more detail with reference to FIG. 4.

A signal processing unit 314 converts a picture photographed by a camera 312 into an video signal. A video processing unit 316 generates picture data for displaying the image signal output from the signal processing unit 314. The video processing unit transmits the video signal and data to a display unit 318 to match the display standards for the display unit 318 under the control of the control unit 300.

Referring to FIG. 3, the operation of the mobile communication terminal will now be explained in more detail. The name of the opposite party input through the keypad 308 is input to the mobile communication terminal. Here, on the keypad 308, characters and numerals which are mapped in the mapping table are input. The control unit 300 extracts the initial characters corresponding to the syllables or space units using the name of the opposite party input from the keypad 308, and gives the abbreviated number to the opposite party information by mapping the extracted initial characters on the numerals with reference to the mapping table in which the initial characters are mapped on the numerals. Since the control unit 300 gives the abbreviated number to the opposite party information using the respective initial characters of the name of the opposite party, a duplicate part may occur, and in this case, the control unit 300 allocates the previous address or the next address of the abbreviated number to the duplicate part. Meanwhile, it is also possible to indicate the duplicate part as a sub-item using a special character '_' or '-'. Additionally, in the case of storing the abbreviated number, the control unit displays the abbreviated number through an output device and receives the user's confirmation. The name of the opposite party for which the abbreviated number is set and the opposite party's information are stored in the memory 310.

Then, in the case of using the mobile communication terminal that has passed through the pre-input process, the user inputs the respective initial characters of the name of the opposite party, the input characters are mapped on the numerals through the mapping table, and then the numerals are input to the mobile communication terminal through the keypad 308. The control unit 300 searches for the name of the opposite party having the initial characters that correspond to the numerals, which comprise the abbreviated number, from the opposite party's information stored in the memory 310 through the mapping table, and displays the searched abbreviated number through the display unit 318 or performs a dialing operation according to the searched abbreviated number. In the above description, the method for setting the abbreviated number according to an embodiment of the present invention is applied to the mobile communication terminal, but it is also possible to apply the method according to an embodiment of the present invention to all media that use an abbreviated number setting function through mapping of numerals and characters.

Figure 4:
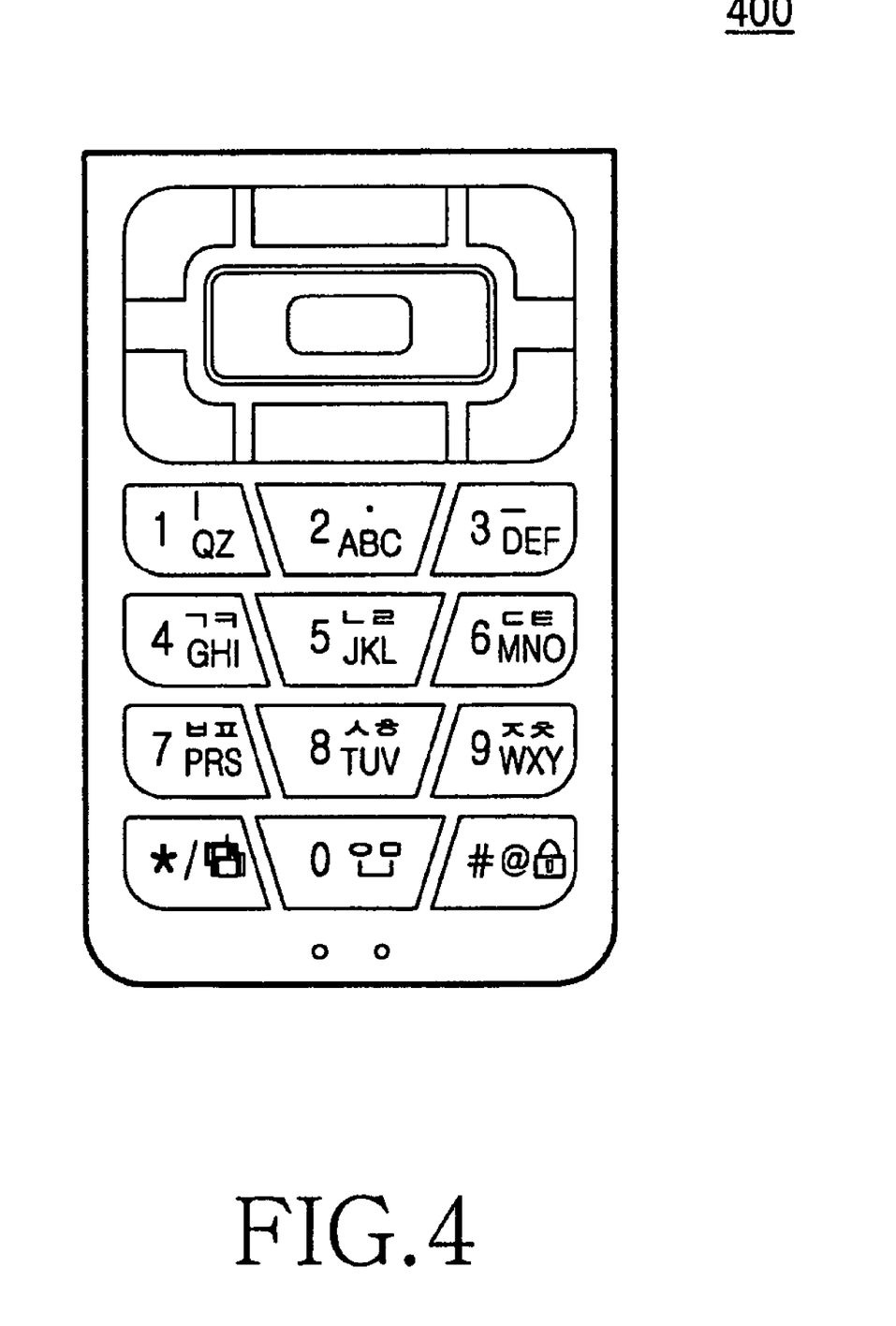
FIG. 4 is a view illustrating a keypad having keys on which numerals and characters are mapped in a mobile communication terminal adapted to set an abbreviated number according to an embodiment of the present invention.

FIG. 4 is a view illustrating a keypad having keys on which numerals and characters are mapped in a mobile communication terminal adapted to set an abbreviated number according to an embodiment of the present invention.

Referring to FIG. 4, the process of setting the name of the opposite party and the abbreviated number according to an embodiment of the present invention will now be explained in more detail. The construction of the mapping table and the keypad of the mobile communication terminal according to the combination of characters and numerals will also be explained later in more detail.

The user of the mobile communication terminal 400 should input the phone number of the opposite party and the opposite party's information to the mobile communication terminal. With reference to FIG. 4, the setting of the abbreviated number with respect to the name of the opposite party in English and in Hangul will now be explained in more detail.

Table 1 below is a table that indicates a mapping table in which characters and numerals are mapped. Through this mapping table, the numerals and the characters are mapped on the keypad.

TABLE 1

| 1 | Q, Z |
| 2 | A, B, C |
| 3 | D, E, F |
| 4 | G, H, I |
| 5 | J, K, L |
| 6 | M, N, O |
| 7 | P, R, S |
| 8 | T, U, V |
| 9 | W, X, Y |
| 0 | |

In the case of using the English characters as above, for example, if the user inputs the name of the opposite party 'Michael Jordan' in order to input the phone number of 'Michael Jordan', the mobile communication terminal extracts the initial characters 'M' and 'J' that correspond to the name of the opposite party 'Michael Jordan'. The mobile communication terminal sets the abbreviated number of '65' by mapping '6' corresponding to the character 'M' and '5' corresponding to the character 'J' according to the mapping of the keypad of FIG. 2, and sets the name of the opposite party 'Michael Jordan', phone number of 'Michael Jordan', representative item, message, or other information, with respect to the abbreviated number of '65'.

Meanwhile, if the user inputs the name of the opposite party 'George W. Bush' in order to input the phone number of 'George W. Bush', the mobile communication terminal extracts the initial characters 'G', 'W' and 'B' that correspond to the name of the opposite party 'George W. Bush'. The mobile communication terminal sets the abbreviated number of '492' by mapping '4' corresponding to the character 'G', '9' corresponding to the character 'W', and '2' corresponding to the character 'B' according to the mapping of the keypad of FIG. 2, and sets the name of the opposite party 'George W. Bush', phone number of 'George W. Bush', representative item, message, or other information, with respect to the abbreviated number of '492'.

In the same manner as the above method, in the case of 'John Fitzgerald Kennedy', the initial characters are 'J', 'F' and 'K', and the abbreviated number is set to '535'. In the case of 'Celine Dion', the initial characters are 'C' and 'D', and the abbreviated number is set to '23'.

In mapping the initial characters of the opposite party's name on the numerals, a duplicate abbreviated number may be given with respect to different opposite parties because the numerals are limited to 0 to 9 in comparison to the number of characters. For example, the same abbreviated number may be given with respect to opposite parties named 'Michael Jordan' and 'Michael Joseph'. Specifically, in a state that the abbreviated number of '65' has been stored with respect to the opposite party 'Michael Jordan' by mapping '65' corresponding to 'M' and '5' corresponding to 'J', an input of 'Michael Joseph' may be requested. In this case, the abbreviated number of 'Michael Joseph' is a duplicate to that of 'Michael Jordan', also set to '65', and in order to avoid the duplication, an abbreviated number of '66' or '64' that are not in use or '65-1' may be stored with respect to 'Michael Joseph'.

Thereafter, if an input of 'Michael Jackson' is requested, the duplication of 'M' and 'J' occurs again. In this case, if the abbreviated numbers of '65' and '65-1' are in use, the abbreviated number of '65-2' may be stored with respect to 'Michael Jackson'.

Additionally, an input of 'Elden Kenson' of which the initial characters correspond to the same numerals '6' and '5' may be requested. In this case, the abbreviated number of '65' has already been in use, and thus the abbreviated number of '68', for instance, that is not in use or '65-2' may be stored with respect to 'Elden Kenson'.

What the user inputs as the number of the opposite party may be a name of a public institution, company name, firm name, nickname, pet name, and the like, in addition to the personal name. The above-described method according to the present invention can also be applied to all kinds of names including the above names.

Now, the setting method of the abbreviated number with respect to the number of the opposite party in Hangul will be explained.

Table 2 below is a table that indicates a mapping table in which consonants of Hangul, which are the initial sounds of Hangul, and numerals are mapped. Through this mapping table, the numerals and the characters are mapped on the keypad.

TABLE 2

| 4 | ㄱ, ㅋ |
|---|---|
| 5 | ㄴ, ㄹ |
| 6 | ㄷ, ㅌ |
| 7 | ㅂ, ㅍ |
| 8 | ㅅ, ㅎ |
| 9 | ㅈ, ㅊ |
| 0 | ㅇ, ㅁ |

In the case of using Hangul characters as above, for example, if the user inputs the name of the opposite party '김철수'in order to input the phone number of '김철수'the mobile communication terminal extracts the initial characters 'ㄱ','ㅊ'and 'ㅅ'of syllables or space units that correspond to the name of the opposite party '김철수'The mobile communication terminal sets the abbreviated number of '498' by mapping '4' corresponding to the character 'ㄱ','9' corresponding to the character 'ㅊ'and '8' corresponding to the character 'ㅅ'according to the mapping of the keypad of FIG. 2, and sets the name of the opposite party '김철수'phone number of '김철수'representative item, message, or other information, with respect to the abbreviated number of '498'.

Meanwhile, if the user inputs the name of the opposite party '이영희'in order to input the phone number of '이영희'the mobile communication terminal extracts the initial characters 'ㅇ','ㅇ'and 'ㅎ'that correspond to the name of the opposite party '이영희'The mobile communication terminal sets the abbreviated number of '008' by mapping '0' corresponding to the character 'ㅇ''0' corresponding to the character 'ㅇ'and '8' corresponding to the character 'ㅎ'according to the mapping of the keypad of FIG. 2, and sets the name of the opposite party '이영희'phone number of '이영희'representative item, message, or other information, with respect to the abbreviated number of '008'.

In the same manner as the above method, in the case of '홍길동',the initial characters are 'ㅎ','ㄱ'and 'ㄷ',and the abbreviated number is set to '846'. In the case of '홍길동',the initial characters are 'ㄷ','ㅊ',and 'ㄱ',and the abbreviated number is set to '964'.

Meanwhile, the name of the opposite party may be the name of a public institution such as '국립 중앙 도서관'.If the user inputs the name of the opposite party '국립 중앙 도서관'in order to input the phone number of '국립 중앙 도서관',the mobile communication terminal extracts the initial characters 'ㄱ','ㅊ',and 'ㄷ',that correspond to the name of the opposite party '국립 중앙 도서관'.The mobile communication terminal sets the abbreviated number of '496' by mapping '4' corresponding to the character 'ㄱ','9' corresponding to the character 'ㅊ',and '6' corresponding to the character 'ㄷ',according to the mapping of the keypad of FIG. 2, and sets the name of the opposite party '국립 중앙 도서관',phone number of '국립 중앙 도서관',representative item, message, or other information, with respect to the abbreviated number of '496'. As described above, the initial characters of the name of the opposite party may be detected in the unit of a space instead of a syllable.

If the user intends to make a phone call to a desired opposite party using the abbreviated number after the above-described input process, he/she makes a call using the respective initial characters of the opposite party's name or the abbreviated number corresponding to the initial characters of the opposite party's name. Additionally, in using the method of mapping the characters on the numerals, the method may be modified according to the characteristics of respective countries and languages.

Figure 5:
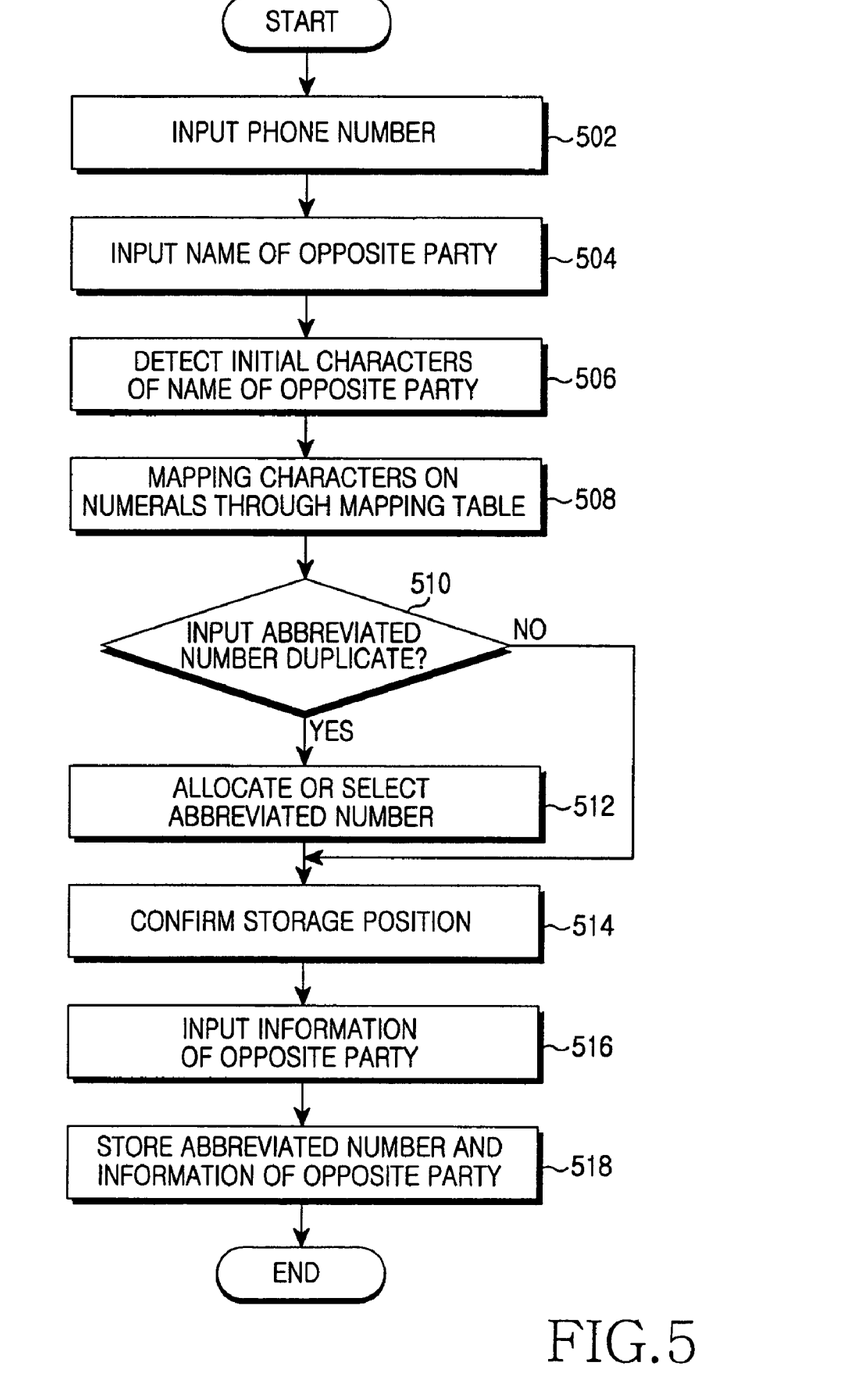
FIG. 5 is a view illustrating a process of setting and storing characters and abbreviated numbers according to an embodiment of the present invention.

FIG. 5 is a view illustrating a process of setting and storing characters and abbreviated numbers according to an embodiment of the present invention.

Referring to FIG. 5, the user should perform a pre-input process through the mobile communication terminal before he/she uses the abbreviated number of the mobile communication terminal. The mobile communication terminal receives an input of an opposite party's phone number from the user (step 502). At this time, the mobile communication terminal receives the opposite party's name corresponding to the opposite party's phone number from the user (step 504). In an embodiment of the present invention, which is a method of mapping the opposite party's name on the abbreviated number, the mobile communication terminal receives the opposite party's name from the user. The mobile communication terminal that has received and recognized the opposite party's name detects characters corresponding to the initial characters of the units constituting the opposite party's name, which are discriminated by syllables or space units of the opposite party's name, such as the name, family name, or similar information, of the opposite party (step 506). The detected initial characters are mapped on the numerals in advance through the mapping table provided in the mobile communication terminal, and thus the mobile communication terminal maps the initial characters on the numerals corresponding to the characters through the mapping table (step 508). Then, the mobile communication terminal determines whether the initial characters of the opposite party's name are a duplicate and can be set as the abbreviated number of the terminal (step 510). If the abbreviated number corresponding to the initial characters of the opposite party's name has already been in use and is a duplicate as a result of the determination, the mobile communication terminal allocates another unused abbreviated number to the opposite party or receives a user's selection of another unused abbreviated number (step 512).

If the mobile communication terminal selects the abbreviated number through the user's input, it allocates another abbreviated number that is the previous abbreviated number, the next abbreviated number or a sub-item of the abbreviated number in which the input initial sound or initial characters are used. For instance, from the previous example, if 'Michael Jordan' was already stored at the abbreviated number '65', then '66' or '64' or '65-1' would be assigned to be used. The user can also set the abbreviated number that can be mapped by direct input from the user. Then, the mobile communication terminal receives the user's confirmation of the storage position where the opposite party's phone number, abbreviated number, opposite party's information, or other information (step 514). At this time, the mobile communication terminal receives an input of the abbreviation number and the opposite party's information such as the opposite party's phone number (such as the mobile phone number, home phone number, office phone number, or other number), message, or other information, from the user (step 516). Then, the mobile communication terminal stores the abbreviated number, the opposite party's name for which the abbreviated number is set, and the opposite party's information (step 518).

Figure 6:
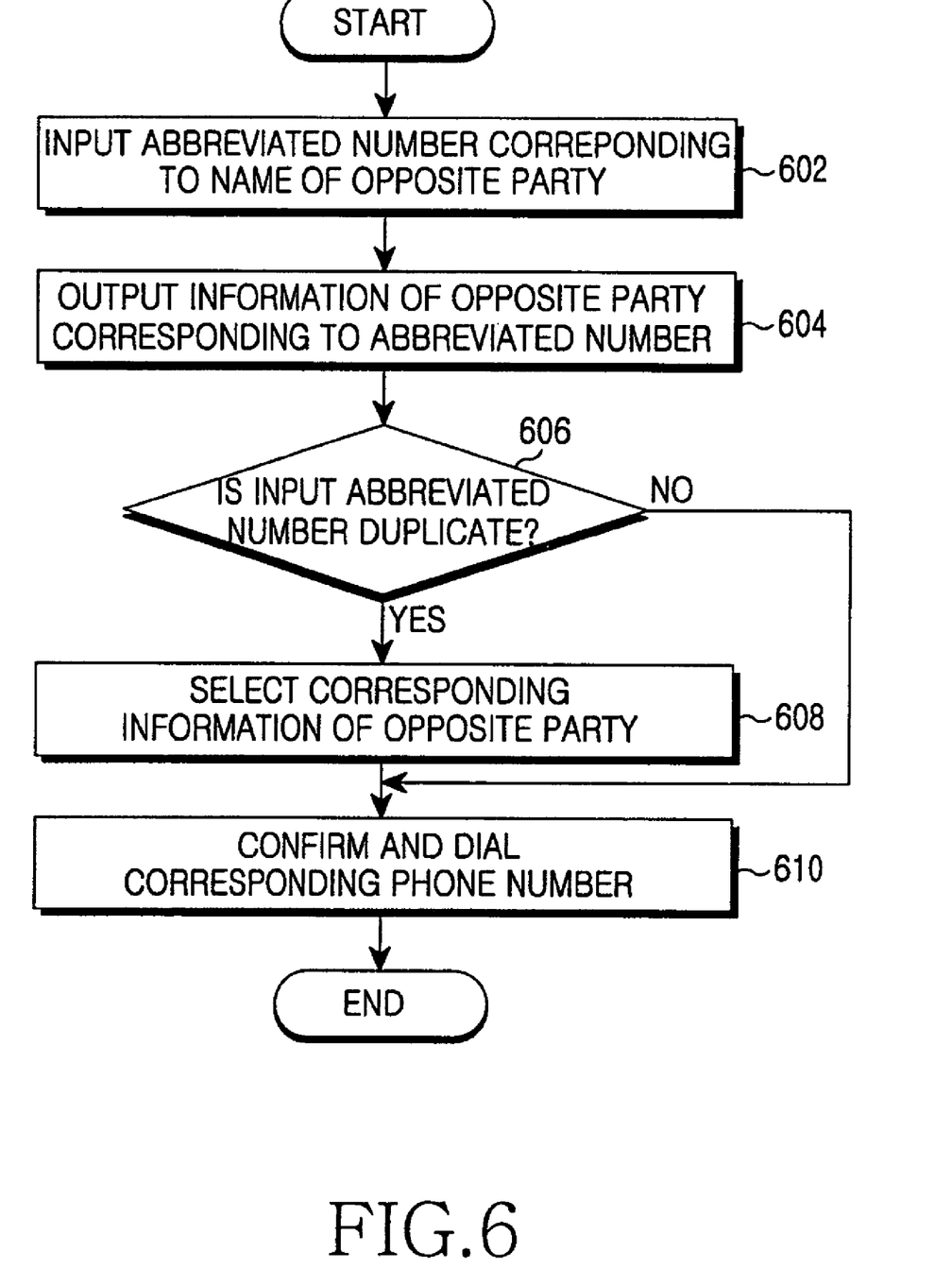
FIG. 6 is a view illustrating a dialing process using an abbreviated number according to an embodiment of the present invention.

FIG. 6 is a view illustrating a dialing process using an abbreviated number according to an embodiment of the present invention.

Referring to FIG. 6, the mobile communication terminal receives an input of the abbreviated number mapped on the initial characters of the name of the opposite party to which the user desires to make a phone call through the key pad of the mobile communication terminal (step 602). If the abbreviated number is input, the mobile communication terminal searches for the opposite party's name corresponding to the abbreviated number and the opposite party's information that corresponds to the opposite party's name, and outputs the result of the search (step 604). In this case, the result of the search may be one or two or more duplicate opposite party's since the opposite party's information mapped on the abbreviated number may be stored as the sub-item of the abbreviated number. The mobile communication terminal determines whether duplicate opposite parties exist corresponding to the abbreviated number (step 606). At this time, if the duplicate opposite parties exist as a result of the determination, the mobile communication terminal receives the user's selection of the corresponding opposite party's information from among the searched duplicate opposite parties' information (step 608). If only one opposite party mapped on the abbreviated number exists, the mobile communication terminal receives the user's confirmation of the desired opposite party, and then performs the dialing operation (step 610).

As described above, according to an embodiment of the present invention, the mobile communication terminal for setting the abbreviated numbers that employs the dialing method using the initial characters of syllables or space units of the opposite party's name and the set abbreviated number has the advantages in that the user can make a phone call to all stored opposite parties using the opposite parties' names and the set abbreviated numbers without the necessity of remembering all the stored abbreviated numbers in comparison to the conventional mobile communication terminal for setting the abbreviated numbers. Also, since the user uses the initial characters of the opposite party's name that is already know to the user in searching for the desired opposite party, the time required for the search can be reduced. Also, in using the abbreviated number, the functional utility of the abbreviated number itself is advantageous. Additionally, by using the opposite party's name and the set abbreviated number, the above-described phone number searching method can flexibly be applied to a number of diverse languages. Furthermore, by only having to input the initial characters of a respective preset unit, a user does not have to know the precise spelling of a name for recall purposes.

While the present invention has been shown and described with reference to certain preferred embodiments thereof, it will be understood by those skilled in the art that various changes in form and details may be made therein without departing from the spirit and scope of the present invention. Thus, it is intended that the present invention covers the modifications and variations of this invention within the scope of the appended claims and their equivalents.

What is claimed is:

1. An apparatus for mapping abbreviated numbers in a mobile communication terminal, comprising:
   a memory for storing a mapping table in which numerals are mapped on respective characters, information of opposite parties, and abbreviated numbers generated and mapped on the information of the opposite parties by extracting the numerals from the mapping table in correspondence to initial characters of respective preset units that constitute names of the opposite parties in the information of the opposite parties; and
   a control unit for operating to extract the initial characters from the respective preset units that constitute the name of the opposite party, and mapping the abbreviated number on the information of the opposite party by mapping the extracted characters on the numerals in the mapping table if the information of the opposite party is inputs,
   wherein if the abbreviated number mapped on the information of the opposite party has already been in use and the abbreviated number has been selected by a user, the control unit maps and stores a previous number or a next number of the abbreviated number that has been in use as the abbreviated number of the information of the opposite party.

2. The apparatus as claimed in claim 1, wherein if the abbreviated number mapped on the information of the opposite party has already been in use and the abbreviated number has been selected by a user, the control unit maps and stores a sub item of the abbreviated number that has been in use as the abbreviated number of the information of the opposite party.

3. The apparatus as claimed in claim 1, wherein the preset unit is a syllable unit or a space unit.

4. The apparatus as claimed in claim 1, wherein the generated abbreviated number has information of the opposite party comprising a name of a public institution, a company name, a firm name, nickname, or a pet name, in addition to the personal name mapped on it.

5. A method of mapping abbreviated numbers in a mobile communication terminal, comprising the steps of:
   if information of an opposite party is input, extracting initial characters from preset units that constitute a name of the opposite party in the input information of the opposite party;
   detecting numerals pre-mapped on the respective extracted characters and mapping the detected numerals on an abbreviated number of the information of the opposite party; and
   mapping and storing the information of the opposite party and the abbreviated number mapped on the information of the opposite party,
   wherein if the abbreviated number has already been in use and the abbreviated number has been selected by a user, a previous number or a next number of the abbreviated number that has been in use is mapped and stored as the abbreviated number of the information of the opposite party.

6. The method as claimed in claim 5, wherein if the abbreviated number has already been in use and the abbreviated number has been selected by a user, a sub item of the abbreviated number that has been in use is mapped and stored as the abbreviated number of the information of the opposite party.

7. The method as claimed in claim 5, wherein the preset unit is a syllable unit or a space unit.

8. The method as claimed in claim 5, wherein the generated abbreviated number has information of the opposite party comprising a name of a public institution, company name, firm name, nickname, or pet name, in addition to the personal name mapped on it.

9. A method for dialing a telephone number stored in a mobile communication terminal comprising the steps of:
- inputting characters corresponding to preset units that constitute a name of an opposite party;
- mapping the input characters to a specific number according to a mapping table;
- outputting a list of at least one abbreviated number corresponding to the input characters to a display unit;
- selecting an abbreviated number to be dialed from the list of at least one abbreviated numbers output to the display unit; and
- confirming and dialing opposite party's number corresponding to the selected abbreviated number,
- wherein if the abbreviated number has already been in use and the abbreviated number has been selected by a user, a previous number or a next number of the abbreviated number that has been in use is mapped and stored as the abbreviated number of the information of the opposite party.

10. The method as claimed in claim 9 wherein the name of an opposite party comprises a name of a public institution, a company name, a firm name, a nickname, or a pet name.

11. The method as claimed in claim 9, wherein the abbreviated number corresponds to initial characters of respective preset units that constitute the name of the opposite party.

12. An mobile communication terminal apparatus comprising:
- an input device for receiving character inputs corresponding to preset units that constitute a name of an opposite party to be called;
- a memory for storing a list of abbreviated numbers that correspond to sets of characters, wherein the memory comprises a mapping table for mapping character inputs to an abbreviated number;
- a display unit for displaying a list of at least one abbreviated number corresponding to the characters input through the input device; and
- a control unit for outputting a list of at least one abbreviated number corresponding to the characters input through the input device to a display unit,
- wherein the control unit confirms and dials opposite party's number corresponding to the selected abbreviated number,
- wherein if the abbreviated number has already been in use and the abbreviated number has been selected by a user, a previous number or a next number of the abbreviated number that has been in use is mapped and stored as the abbreviated number of the information of the opposite party.

13. The apparatus of claim 12, wherein an abbreviated number is a number having less digits than a telephone number.

14. The apparatus of claim 12, wherein the abbreviated number corresponds to initial characters of respective preset units that constitute the name of the opposite party.

* * * * *